United States Patent
Tomioka (10) Patent No.: US 10,942,468 B2
(45) Date of Patent: Mar. 9, 2021

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroyuki Tomioka, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 118 days.

(21) Appl. No.: 16/314,585

(22) PCT Filed: Oct. 16, 2017

(86) PCT No.: PCT/JP2017/037373
§ 371 (c)(1),
(2) Date: Dec. 31, 2018

(87) PCT Pub. No.: WO2018/079322
PCT Pub. Date: May 3, 2018

(65) Prior Publication Data
US 2019/0324381 A1 Oct. 24, 2019

(30) Foreign Application Priority Data
Oct. 24, 2016 (JP) .............................. JP2016-208118

(51) Int. Cl.
*G03G 15/04* (2006.01)
*G02B 7/02* (2021.01)
(Continued)

(52) U.S. Cl.
CPC ........... *G03G 15/0409* (2013.01); *G02B 7/02* (2013.01); *G02B 26/12* (2013.01); *G03G 15/04072* (2013.01); *H04N 1/113* (2013.01)

(58) Field of Classification Search
CPC .... G02B 26/123; G02B 26/124; G02B 26/10; G02B 26/127; G02B 26/125;
(Continued)

(56) References Cited

U.S. PATENT DOCUMENTS

2008/0118287 A1* 5/2008 Masaki .............. H04N 1/00909
399/350
2008/0273254 A1 11/2008 Park
(Continued)

FOREIGN PATENT DOCUMENTS

JP 10-232360 9/1998
JP H10232360 A * 9/1998 ............. G02B 26/10
(Continued)

OTHER PUBLICATIONS

Tomita, K—JPH10232360A—Jun. 1998—English machine translation (Year: 1998).*
(Continued)

*Primary Examiner* — William R Alexander
*Assistant Examiner* — Sharrief I Broome
(74) *Attorney, Agent, or Firm* — Wenderoth, Lind & Ponack, L.L.P.

(57) ABSTRACT

An optical scanning device (30) includes a first elastic member (51) fixed to a bottom wall of a casing (31) and compressed by a lower surface of an image forming lens (36) and the bottom wall to close a gap between the lower surface of the image forming lens (36) and the bottom wall, and a second elastic member (52) fixed to a lid member (37) and compressed by an upper surface of the image forming lens (36) and the lid member (37) to close a gap between the upper surface of the image forming lens (36) and the lid member (37).

6 Claims, 8 Drawing Sheets

(51) Int. Cl.
  *G02B 26/12* (2006.01)
  *H04N 1/113* (2006.01)
(58) Field of Classification Search
  CPC ........... G02B 26/101; G02B 26/121; G02B 13/0005; G02B 26/12; G02B 27/0018; G02B 5/09; G02B 26/08; G02B 26/085; G02B 26/0858; G02B 26/105; G02B 27/104; G02B 27/283; G02B 7/008; G02B 7/028; G02B 21/0048; B41J 2/473; B41J 2/471; B41J 2/442; B41J 2/455; B41J 2/451; B41J 2/00; B41J 2/44; B41J 2/447; B41J 2/45; G03G 15/04072; G03G 15/0435; G03G 15/043; G03G 15/04; G03G 15/04036; G03G 15/04045; G03G 15/0409; G03G 2215/0404; G03G 15/28; G03G 21/1666; G03G 15/011; G03G 21/1619; G03G 2215/0132; G03G 2215/0402; G03G 2215/0407; H01S 5/423; H01S 5/18311; H01S 5/1835; H01S 5/18358; H01S 5/18347; H01S 5/18355; H01S 5/18391; H01S 5/3202; H01S 2301/14; H01S 2301/18; H01S 5/02296; H01S 5/18; H01S 5/18386; H01S 5/18394; H01S 5/3403; H01S 5/3432; H01S 5/3436; H01S 2301/176; H01S 3/0071; H01S 3/03; H04N 1/1135; H04N 1/113; H04N 2201/02416; H04N 2201/02435; H04N 2201/02481; H04N 1/0283; H04N 1/04; H04N 1/12; H04N 1/506; H04N 2201/0082; H04N 2201/04774; H04N 9/3129; H04N 13/32; H04N 13/363; H04N 13/398; H04N 1/00519; H04N 1/00549; H04N 1/00559; H04N 1/02481; H04N 1/02815

See application file for complete search history.

(56) References Cited

U.S. PATENT DOCUMENTS

| | | | | |
|---|---|---|---|---|
| 2011/0316958 | A1* | 12/2011 | Johno | B41J 2/473 |
| | | | | 347/224 |
| 2012/0050835 | A1* | 3/2012 | Otani | G02B 7/008 |
| | | | | 359/204.1 |
| 2015/0331362 | A1* | 11/2015 | Azeyanagi | F16J 15/04 |
| | | | | 399/102 |
| 2016/0219177 | A1 | 7/2016 | Otoguro et al. | |
| 2016/0231562 | A1* | 8/2016 | Suga | H04N 1/047 |
| 2017/0123339 | A1* | 5/2017 | Takano | G03G 15/043 |

FOREIGN PATENT DOCUMENTS

| | | |
|---|---|---|
| JP | 11-183818 | 7/1999 |
| JP | 2001-133719 | 5/2001 |
| JP | 2002-341277 | 11/2002 |
| JP | 2007-164048 | 6/2007 |
| JP | 2015-52700 | 3/2015 |

OTHER PUBLICATIONS

International Search Report dated Dec. 12, 2017 in corresponding International Application No. PCT/JP2017/037373.

* cited by examiner

OPTICAL SCANNING DEVICE AND IMAGE FORMING APPARATUS INCLUDING THE SAME

TECHNICAL FIELD

The present invention relates to an optical scanning device and an image forming apparatus including the same.

BACKGROUND ART

In the related art, as an optical scanning device installed in an electrophotographic image forming apparatus, there has been known an optical scanning device including a polygon mirror that deflects and scans light beams emitted from a light source, a driving motor that drives the polygon mirror, and an image forming lens provided on an optical path of light reflected by the polygon mirror (for example, see Patent Literature 1). The polygon mirror is provided in a bottomed box-like casing in which a ceiling side is opened, and the driving motor is fixed to a bottom wall of the casing. The image forming lens is provided at a side of the polygon mirror on the bottom wall of the casing. The ceiling side of the casing is closed by a lid member and the lid member is formed with a light emitting opening for emitting the light having passed through the image forming lens to an exterior. There is also a case where the light emitting opening is formed on the casing.

In this type of optical scanning device, as the polygon mirror rotates, airflow is generated around the polygon mirror and thus the casing enters a negative pressure state. As a consequence, there is a problem that dust and the like out of the casing enter into the casing from the light emitting opening and are attached to a reflecting surface of the polygon mirror. When the dust and the like out are attached to the reflecting surface of the polygon mirror, optical performance of the optical scanning device is reduced. In this regard, there has been proposed a technology for preventing the entrance of the dust to the casing by covering the light emitting opening by a dustproof glass.

CITATION LIST

Patent Literature

Patent Literature 1: Japanese Unexamined Patent Application Publication No. 2007-164048

SUMMARY OF INVENTION

Technical Problem

In the optical scanning device in which the light emitting opening is covered by the dustproof glass, it is possible to suppress the attachment of dust to the reflecting surface of the polygon mirror, but there is a problem that production cost increases because the dustproof glass itself is expensive.

The present invention has been made to solve the aforementioned problems, and an object of the present invention is to prevent foreign matters entering into a casing through an light emitting opening from being attached to a reflecting surface of a polygon mirror by using an inexpensive configuration.

Solution to Problem

An optical scanning device according to the present invention device includes a casing opened upward, a polygon mirror received in the casing to reflect light of a light source, a motor mounted at a bottom wall of the casing to rotationally drive the polygon mirror, an image forming lens supported from below by a plurality of bosses protruding from the bottom wall of the casing and provided on an optical path of the light reflected by the polygon mirror, a lid member closing an upper side of the casing, and a light emitting opening formed in the casing or the lid member and allowing the light having passed through the image forming lens to pass therethrough.

Furthermore, the optical scanning device further includes a first elastic member fixed to the bottom wall of the casing and compressed by a lower surface of the image forming lens and the bottom wall to close a gap between the lower surface of the image forming lens and the bottom wall, and a second elastic member fixed to the lid member and compressed by an upper surface of the image forming lens and the lid member to close a gap between the upper surface of the image forming lens and the lid member.

Advantageous Effects of Invention

According to the present invention, it is possible to prevent foreign matters entering into a casing through an light emitting opening from being attached to a polygon mirror by using an inexpensive configuration.

DESCRIPTION OF EMBODIMENTS

Hereinafter, embodiments of the present invention will be described in detail on the basis of the drawings. It is noted that the present invention is not limited to the following embodiments.

Figure 1:
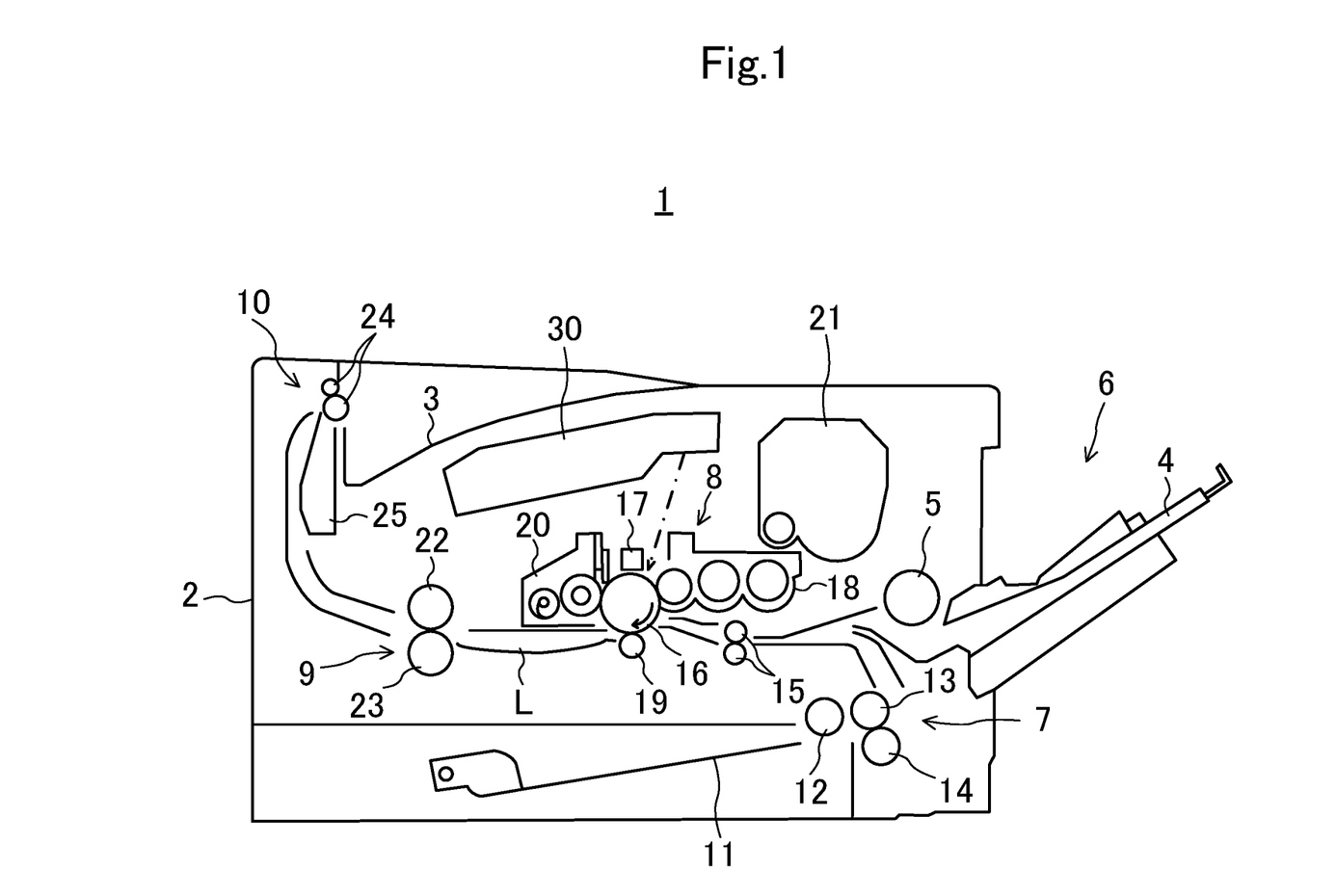
FIG. 1 is an overall schematic view illustrating an image forming apparatus provided with an optical scanning device according to an embodiment.

FIG. 1 is an overall schematic view illustrating a schematic configuration of a laser printer 1 mounted with an optical scanning device in the present embodiment.

As illustrated in FIG. 1, the laser printer 1 includes a box-like printer body 2, a manual sheet feeding unit 6, a cassette sheet feeding unit 7, an image forming unit 8, a fixing unit 9, and a sheet discharge unit 10. Accordingly, the laser printer 1 is configured to form an image on a sheet on the basis of image data transmitted from a terminal and the like (not illustrated) while conveying the sheet along a conveyance path L in the printer body 2.

The manual sheet feeding unit 6 has a manual tray 4 provided at one side of the printer body 2 so as to be openable and closable, and a manual sheet feeding roller 5 rotatably provided inside the printer body 2.

The cassette sheet feeding unit 7 is provided at a bottom part of the printer body 2. The cassette sheet feeding unit 7 includes a sheet feeding cassette 11 that stores a plurality of stacked sheets, a picking roller 12 that takes out the sheets in the sheet feeding cassette 11 one by one, and a feed roller 13 and a retard roller 14 that separate the taken-out sheets one by one and send the separated sheet to the conveyance path L.

The image forming unit 8 is provided above the cassette sheet feeding unit 7 in the printer body 2. The image forming unit 8 includes a photosensitive drum 16 (an image carrying member) rotatably provided in the printer body 2, a charging device 17, a developing unit 18, a transfer roller 19, a cleaning unit 20, which are disposed around the photosensitive drum 16, an optical scanning device 30, and a toner hopper 21, which are disposed above the photosensitive drum 16. Accordingly, the image forming unit 8 is configured to form an image on a sheet supplied from the manual sheet feeding unit 6 or the cassette sheet feeding unit 7.

The conveyance path L is provided with a pair of resist rollers 15 that allow sent sheets to be temporarily waiting and then supply the sheets to the image forming unit 8 at a predetermined timing.

The fixing unit 9 is disposed at a lateral side of the image forming unit 8. The fixing unit 9 includes a fixing roller 22 and a pressure roller 23 brought into press-contact with each other to rotate together. Accordingly, the fixing unit 9 is configured to fix a toner image, which has been transferred to a sheet in the image forming unit 8, to the sheet.

The sheet discharge unit 10 is provided above the fixing unit 9. The sheet discharge unit 10 includes a sheet discharge tray 3, a sheet discharge roller pair 24 for conveying a sheet to the sheet discharge tray 3, and a plurality of conveyance guide ribs 25 for guiding the sheet to the sheet discharge roller pair 24. The sheet discharge tray 3 is formed in a concave shape at an upper part of the printer body 2.

When the laser printer 1 receives image data, the photosensitive drum 16 is rotationally driven and the charging device 17 charges the surface of the photosensitive drum 16 in the image forming unit 8.

Then, on the basis of the image data, laser beams are emitted to the photosensitive drum 16 from the optical scanning device 30. The laser beams are irradiated onto the surface of the photosensitive drum 16, so that an electrostatic latent image is formed. The electrostatic latent image formed on the photosensitive drum 16 is developed in the developing unit 18, so that the electrostatic latent image becomes a visible image as a toner image.

Thereafter, the sheet passes through between the transfer roller 19 and the photosensitive drum 16. In such a case, since a transfer voltage has been applied to the transfer roller 19, the toner image on the surface of the photosensitive drum 16 is moved and transferred to the sheet. The sheet with the transferred toner image is heated and pressed by the fixing roller 22 and the pressure roller 23 in the fixing unit 9. As a consequence, the toner image is fixed to the sheet.

<Optical Scanning Device>

Figure 2:
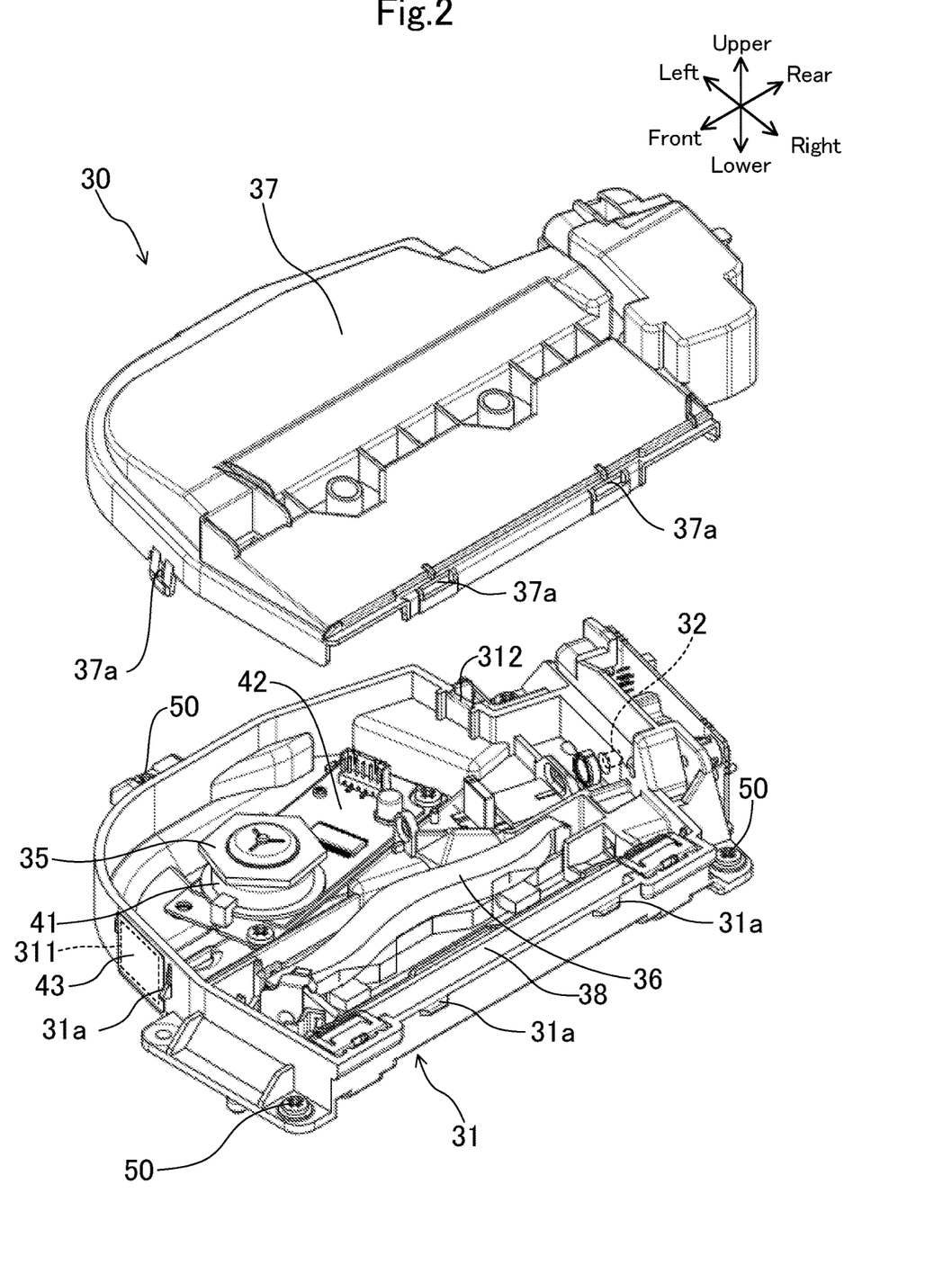
FIG. 2 is an exploded perspective view illustrating a state in which a lid member has been removed from a casing of an optical scanning device.

As illustrated in FIG. 2, the optical scanning device 30 includes a casing 31, a polygon mirror 35 provided in the casing 31 to reflect light from a light source 32, an image forming lens 36 provided on an optical path of the light reflected by the polygon mirror 35 in the casing 31, and a lid member 37 mounted at the casing 31. In the following description, an opened side and a bottom wall side of the casing 31 are respectively defined as an upper side and a lower side of the optical scanning device 30, a scanning direction of the light reflected by the polygon mirror 35 is defined as a front and rear direction of the optical scanning device 30, and a direction orthogonal to the scanning direction is defined as a right and left direction of the optical scanning device 30.

The casing 31 has a bottomed box shape opened upward and the upper side in the casing 31 is closed by the lid member 37. The lid member 37 has a ceiling wall and a sidewall hung down from a peripheral edge of the ceiling wall. Engaging parts 37a formed at the sidewall of the lid member 37 are engaged with engaged parts 31a formed at the casing 31, so that the lid member 37 is mounted at the casing 31.

The polygon mirror 35 is a reflecting mirror having a regular polygonal shape and is rotationally driven by a polygon motor 41. The polygon motor 41 is fixed to the bottom wall of the casing 31 via a board 42 mounted with a control IC.

At a part of a sidewall of the casing 31, which is positioned at a rear side of the polygon motor 41, a rectangular notched part 312 opened upward is formed. An electric harness connected to the polygon motor 41 is drawn out to the outside of the casing 31 through the notched part 312.

At a part of the sidewall of the casing 31, which is positioned at a front side of the polygon motor 41, a rectangular inspection hole 311 is formed. The inspection hole 311 makes the inside and outside of the casing 31 communicate with each other by passing through the sidewall in a thickness direction. The inspection hole 311 is used in order to align an optical axis of the light source 32 when the optical scanning device 30 is assembled. The inspection hole 311 is closed by an adhesive tape 43 (illustrated only in FIG. 2) from the outside of the casing 31 after the optical scanning device 30 is assembled.

The light source 32 is disposed around the sidewall of the casing 31. The light source 32, for example, is a laser light source having a laser diode. Furthermore, the light source 32 is configured to emit laser beams toward the polygon mirror 35. Between the light source 32 and the polygon mirror 35, optical elements such as a collimator lens and a cylindrical lens are disposed.

The image forming lens 36 is an fθ lens and is fixed to the bottom wall of the casing 31 on a lateral side of the polygon mirror 35. The image forming lens 36 extends in the front and rear direction (the main scanning direction) along the bottom wall of the casing 31.

Furthermore, inside the casing 31, a folding mirror 38 is disposed at an opposite side of the polygon mirror 35 with respect to the image forming lens 36. The folding mirror 38 extends in a long shape along the image forming lens 36. On the bottom wall of the casing 31, a light emitting opening 39 (illustrated only in FIG. 6) is formed in an area opposite to the folding mirror 38.

When the optical scanning device 30 operates, laser beams emitted from the light source 32 are converted into parallel beams by the collimator lens, and then are collected on the polygon mirror 35 by the cylindrical lens. The light collected on the polygon mirror 35 is reflected by the reflecting surface of the polygon mirror 35 and is incident on the image forming lens 36 as scanning light. The scanning light having passed through the image forming lens 36 is reflected by the folding mirror 38 and is irradiated to the photosensitive drum 16 out of the casing 31 via the light emitting opening 39. By so doing, the scanning light having an image formed on the surface of the photosensitive drum 16 scans the surface of the photosensitive drum 16 in the main scanning direction due to the rotation of the polygon mirror 35 while scanning the surface of the photosensitive drum 16 in a sub-scanning direction due to the rotation of the photosensitive drum 16, thereby forming an electrostatic latent image on the surface of the photosensitive drum 16.

Figure 3:
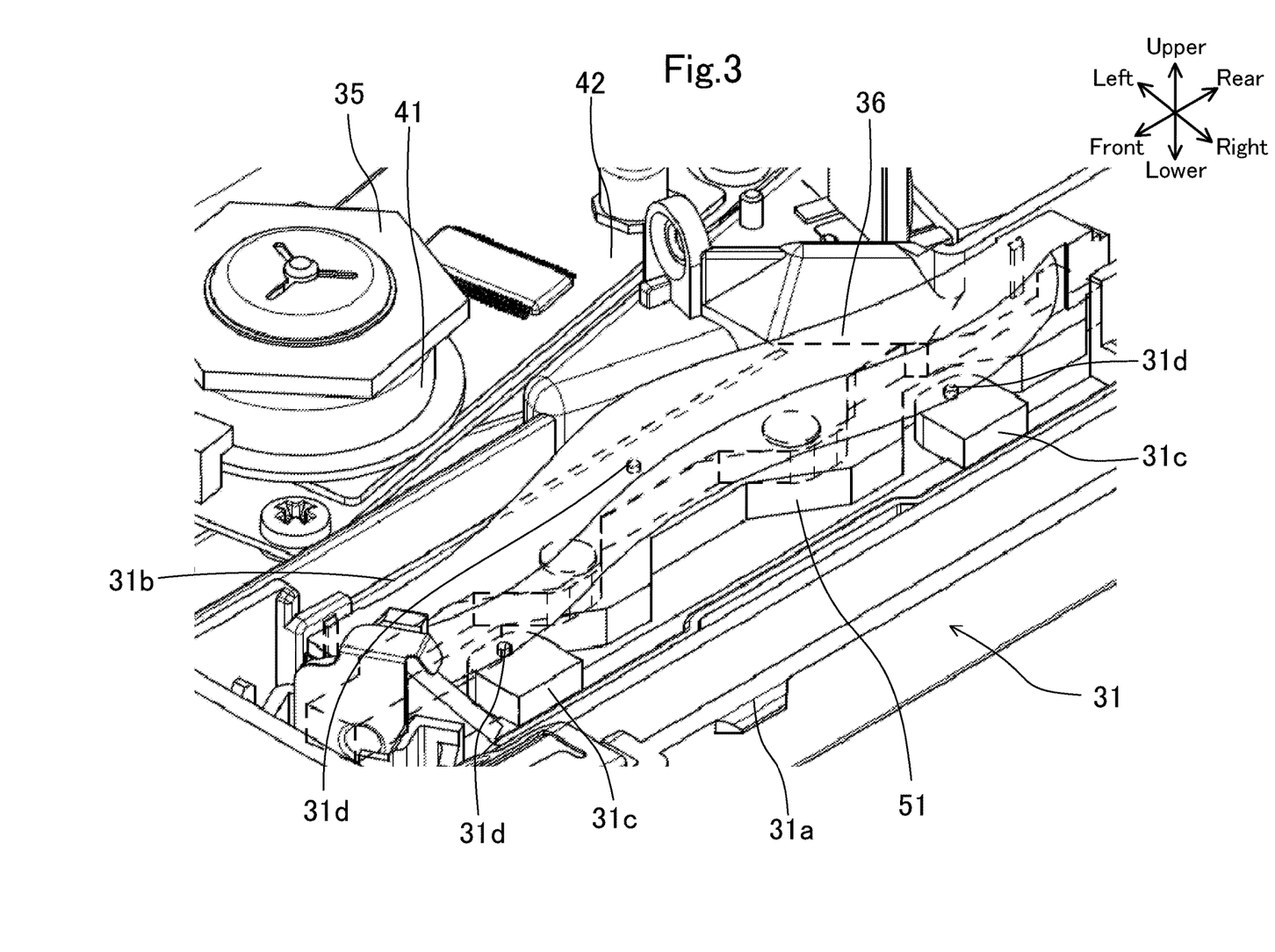
FIG. 3 is an enlarged view illustrating a part at which an image forming lens is provided in a casing of an optical scanning device.

As illustrated in FIG. 3, center part and both end parts of the image forming lens 36 in the front and rear direction are supported by columnar bosses 31d from below, respectively. The image forming lens 36 is fixed to an upper end surface of each columnar boss 31d by an adhesive. The boss 31d, which supports the center part of the image forming lens 36 in the front and rear direction, protrudes from an upper surface of an elongated pedestal 31b extending in the main scanning direction, and the bosses 31d, which support both end parts of the image forming lens 36 in the front and rear direction, protrude to upper surfaces of a pair of rectangular pedestals 31c disposed spaced apart from each other in the front and rear direction. The elongated pedestal 31b (see FIG. 3 and FIG. 6) extends over about the whole in the front and rear direction so as to partition the inside of the casing 31 into the polygon motor 41 side (the polygon mirror 35 side) and the light emitting opening 39 side when viewed from above. The upper surface of the elongated pedestal 31b is formed at a position higher than a part of the bottom wall of the casing 31, at which the polygon motor 41 is installed, and a part, at which the light emitting opening 39 is formed, by one stage.

Between a lower surface of the image forming lens 36 and the bottom wall of the casing 31, a first elastic member 51 is provided. The first elastic member 51 includes a sponge and closes a gap between the lower surface of the image forming lens 36 and the bottom wall of the casing 31 in a state in which the first elastic member 51 has been compressed by the lower surface of the image forming lens 36 and the bottom wall of the casing 31. When viewed from above, the first elastic member 51 extends in the front and rear direction and is formed in a zigzag shape from side to side so as not to interfere with the elongated pedestal 13b and the pair of rectangular pedestals 31c.

Figure 4:
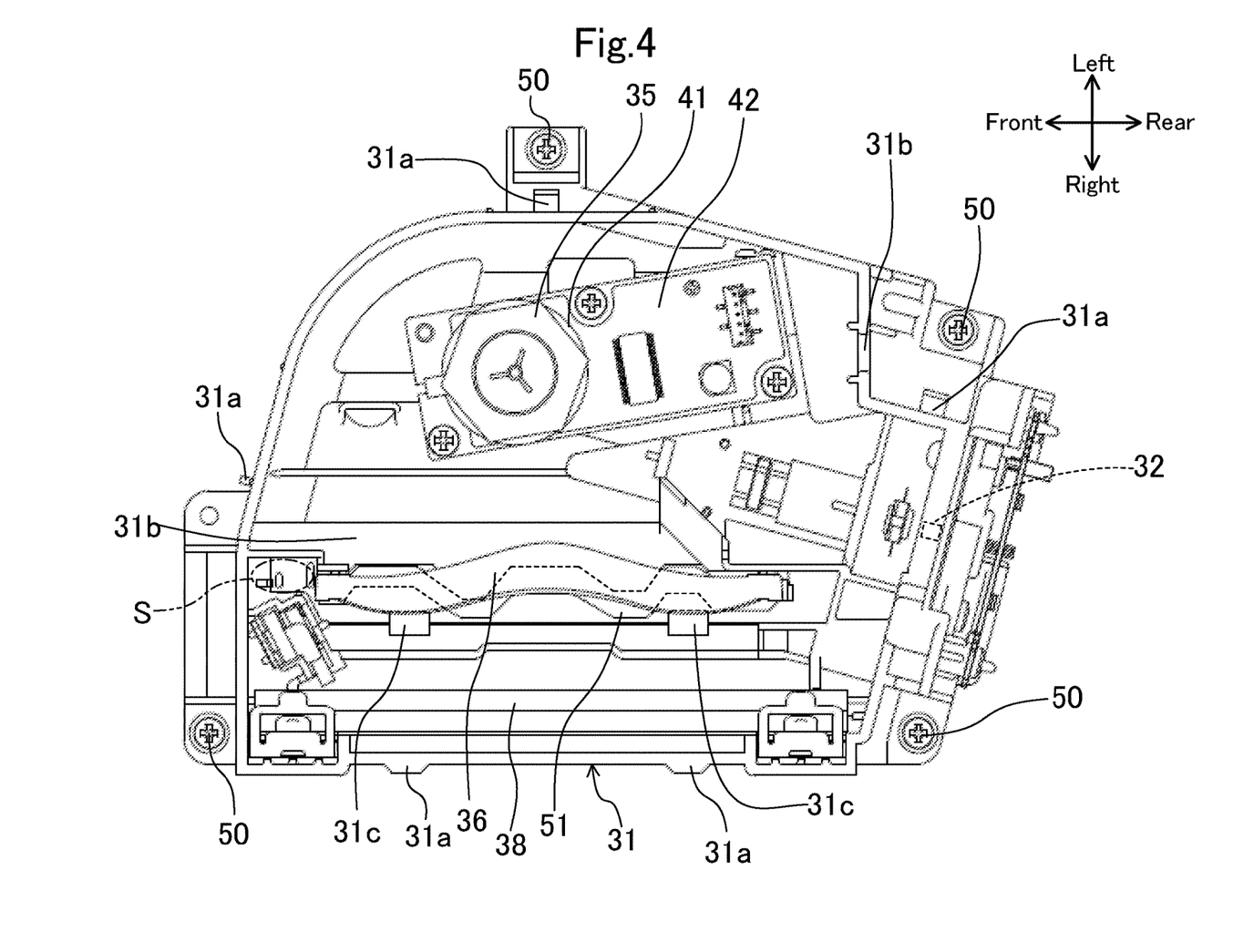
FIG. 4 is a plan view when an interior of a casing of an optical scanning device is viewed from above.

FIG. 4 is a plan view illustrating a state in which the lid member 37 has been removed from the casing 31. As illustrated in FIG. 4, a jig insertion space S is provided at a place adjacent to a front end part of the image forming lens 36 in the casing 31. At the time of assembling work of the optical scanning device 30, a jig such as a pin is inserted into the jig insertion space and thus the front end of the image forming lens 36 abuts the jig, so that positioning of the image forming lens 36 is performed. In this positioning work, it is necessary to allow the image forming lens 36 to slide frontward in a state in which the image forming lens 36 has been placed on an upper side of the first elastic member 51. In such a case, in order to facilitate the sliding of the image forming lens 36, a pet film 53 (see FIG. 7) is stacked on an upper surface of the first elastic member 51 as a low friction member. A friction coefficient of the pet film 53 to the lower surface of the image forming lens 36 is sufficiently smaller than that of the first elastic member 51 to the lower surface of the image forming lens 36. The pet film 53 is fixed to the upper surface of the first elastic member 51 by an adhesive and the image forming lens 36 is placed on the first elastic member 51 via the pet film 53.

Figure 5:
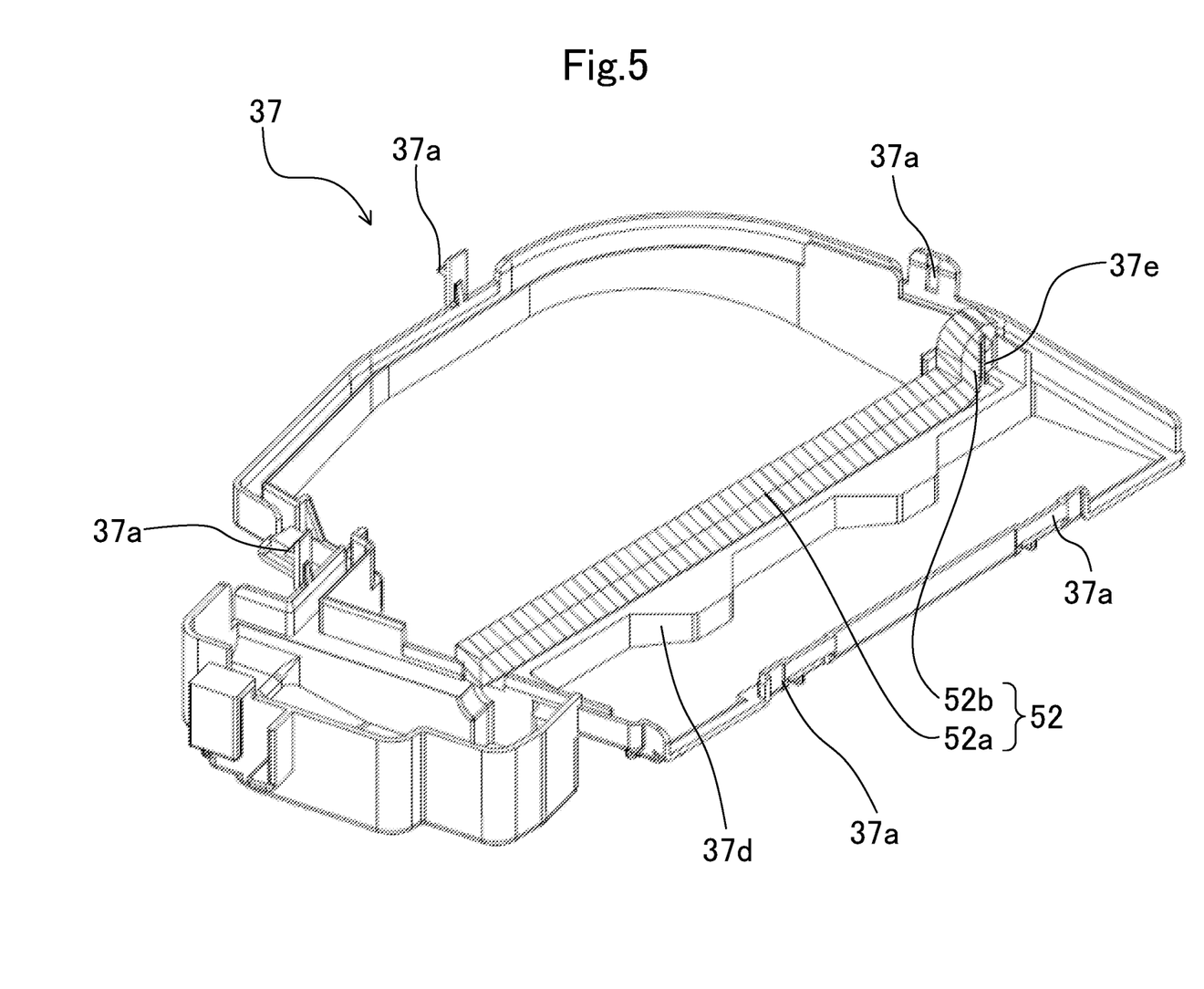
FIG. 5 is a perspective view when a lid member removed from a casing is viewed from an oblique upper side in a state in which a lower surface of the lid member is directed upward.
Figure 6:
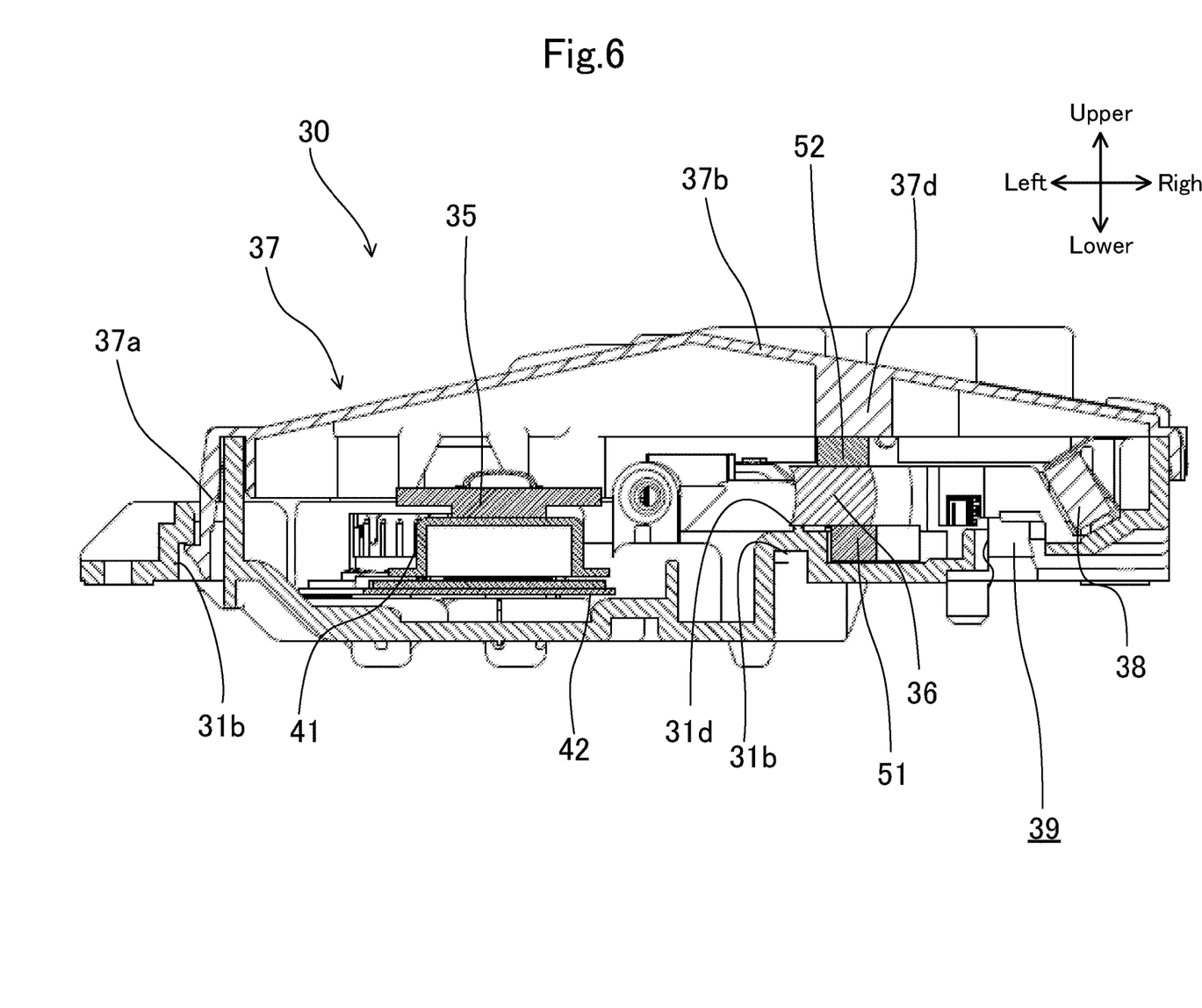
FIG. 6 is a sectional view when an optical scanning device is cut along a plane which passes an axis of a polygon mirror and is perpendicular in a main scanning direction.

As illustrated in FIG. 5 and FIG. 6, from a part of a lower surface of the lid member 37, which corresponds to the image forming lens 36, a pedestal 37d extends over the whole in the front and rear direction and protrudes. A belt-like second elastic member 52 is adhered and fixed to a lower surface of the pedestal 37d. The second elastic member 52 is configured with a sponge (an elastic coefficient is large) harder than the first elastic member 51.

An upper wall of the lid member 37 has a roof shape in which the center in the right and left direction is higher than both end parts, and the pedestal 37d protrudes downward from a right inclined part 37b. A lower end surface of the pedestal 37d is formed to be parallel to an upper surface of the image forming lens 36. In a state in which the lid member 37 has been mounted at the casing 31, the second elastic member 52 is compressed by the lower end surface of the pedestal 37d and the upper surface of the image forming lens 36 to close a gap between the lower end surface of the pedestal 37d and the upper surface of the image forming lens 36.

Figure 7:
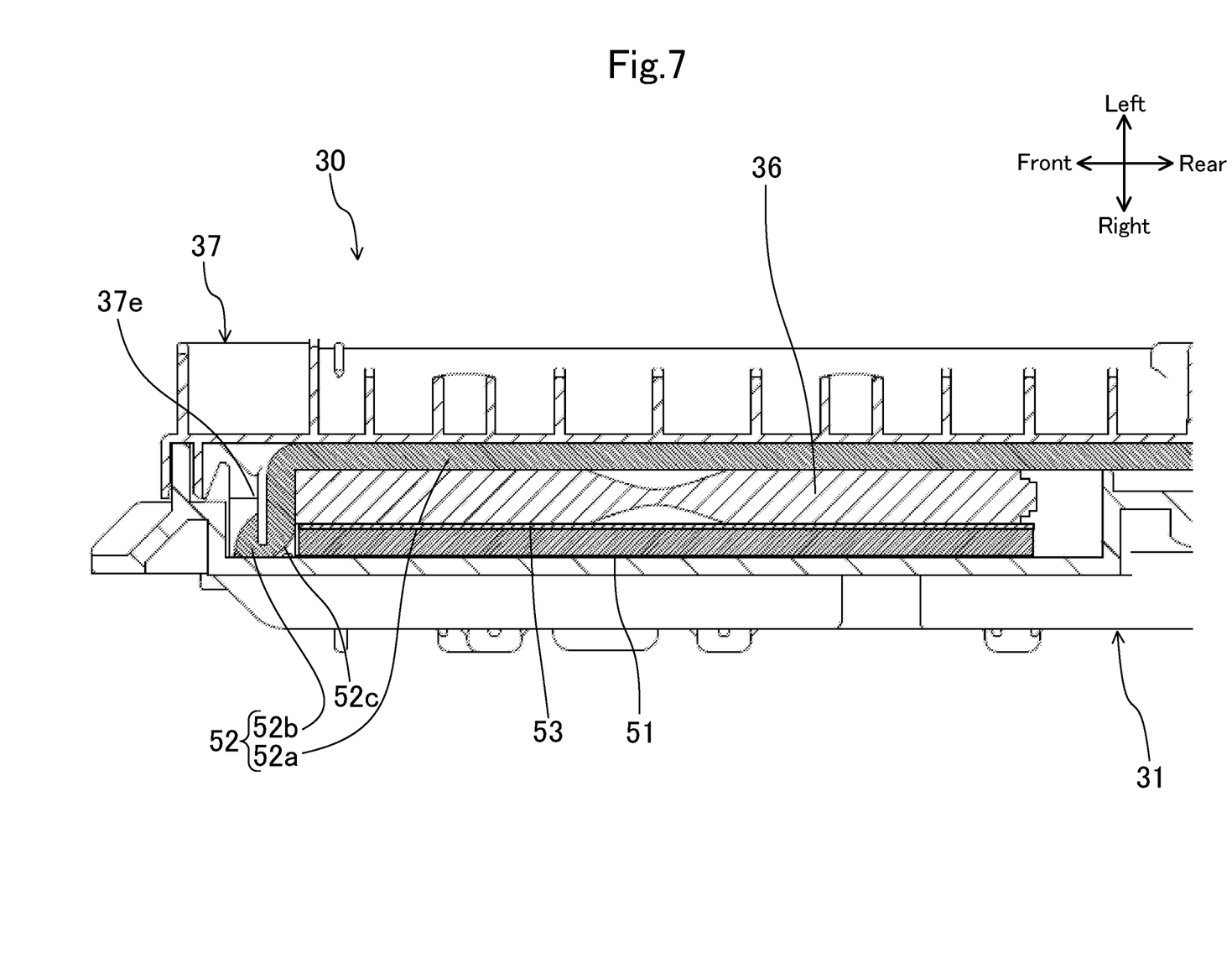
FIG. 7 is a sectional view when an optical scanning device is cut along a vertical plane in a main scanning direction at a place at which an image forming lens is provided.

As illustrated in FIG. 5 and FIG. 7, a plate-like part 37e is vertically installed at a part, which covers an upper side of the jig insertion space S, on the lower end surface of the lid member 37. In the state in which the lid member 37 has been mounted at the casing 31, the plate-like part 37e faces a front end surface of the image forming lens 36 with a space.

The second elastic member 52 has an upper surface closing part 52a and a side closing part 52b. The upper surface closing part 52a extends in the main scanning direction between the upper surface of the image forming lens 36 and the lid member 37. The side closing part 52b extends downward from a front end of the upper surface closing part 52a to cover the front side end surface of the image forming lens 36. The side closing part 52b is adhered and fixed to the plate-like part 37e. The side closing part 52b closes a gap between the plate-like part 37e and the front end surface of the image forming lens 36 in a state of being compressed by the plate-like part 37e and the front side end surface of the image forming lens 36.

The side closing part 52b is elastically deformed such that it extends downward along a surface of the plate-like part 37e, which faces the image forming lens 36 side, and then reaches a side of the plate-like part 37e, which is opposite to the image forming lens, across a lower end of the plate-like part 37e. That is, a lower end of the side closing part 52b is elastically deformed in an approximately U shape so as to hold the lower end of the plate-like part 37e from both sides in a thickness direction (both sides in the front and rear direction). An edge of the lower end of the side closing part 52b, which faces the image forming lens 36 side, has an arc surface shape due to the elastic deformation of the side closing part 52b.

Figure 8:
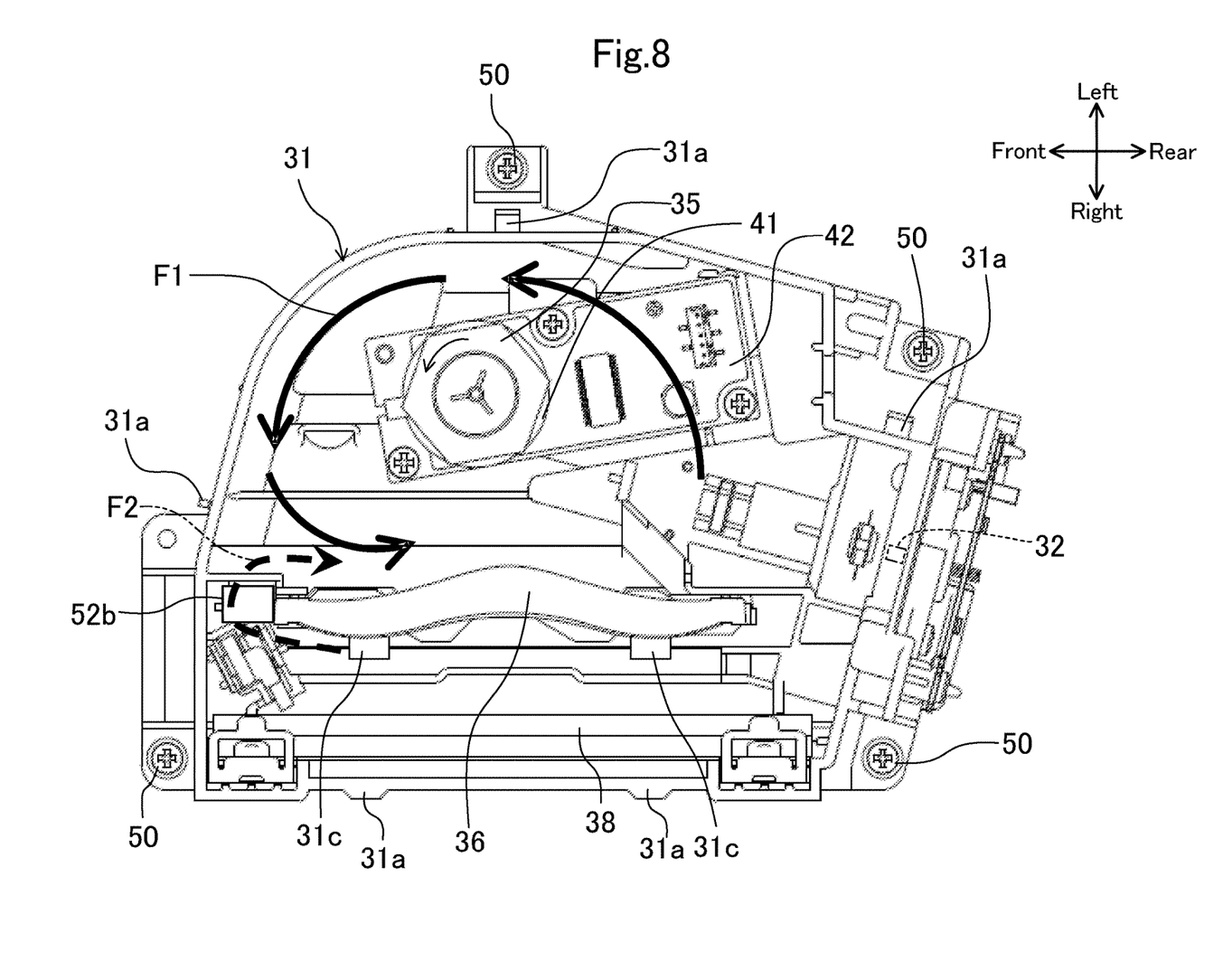
FIG. 8 is a schematic view illustrating the flow of air in a casing when an optical scanning device operates.

When the optical scanning device 30 operates, the polygon mirror 35 rotates in a counterclockwise direction of FIG. 8, so that a circulation air current F1 is induced around the polygon mirror 35 in the counterclockwise direction.

As a consequence, since negative pressure is generated in the casing 31, external air enters into the casing 31 from the light emitting opening 39 (illustrated only in FIG. 6) together with dust. In a related optical scanning device, since entered dust enters to the polygon mirror 35 side from the lower side and the upper side of the image forming lens 36, there is a problem that the optical performance of the optical scanning device is reduced. In this regard, it is considered to close the light emitting opening 39 by a dustproof glass, but since the dustproof glass is expensive, there is a problem that the manufacturing cost of the optical scanning device increases.

In contrast, in the present embodiment, a space between the lower surface of the image forming lens 36 and the bottom wall of the casing 31 is closed by the first elastic member 51 and a space between the upper surface of the image forming lens 36 and the lid member 37 is closed by the second elastic member 52, so that it is possible to prevent dust entered into the casing 31 through the light emitting opening 39 from entering to the polygon mirror 35 side. In this way, it is possible to prevent dust and the like from being attached to the reflecting surface of the polygon mirror 35 without closing the light emitting opening 39 by an expensive dustproof glass.

Furthermore, since the pet film (corresponding to a low friction member) 53, which has a friction coefficient to the image forming lens 36 is smaller than that of the first elastic member 51, is stacked on and fixed to the upper surface of the first elastic member 51, it is easy to allow the image forming lens 36 to slide in the front and rear direction at the time of assembling work of the optical scanning device 30. In this way, it is possible to facilitate the positioning work of the image forming lens 36 in the front and rear direction.

Furthermore, the second elastic member 52 has the upper surface closing part 52a extending in the front and rear direction between the upper surface of the image forming lens 36 and the lid member 37, and the side closing part 52b extending downward from the front side end of the upper surface closing part 52a to cover the front side end surface of the image forming lens 36. In such a case, as illustrated in FIG. 8, airflow is induced from the front side to the rear side in the vicinity of the image forming lens 36 due to the rotation of the polygon mirror 35, resulting in the generation of retraction flow F2 directed to the polygon mirror 35 side from a gap between the front side end surface of the image forming lens 36 and the bottom wall of the casing 31. In the present embodiment, the side closing part 52b is provided at the front end side of the image forming lens 36 at which the retraction flow F2 is generated, so that the retraction flow F2 is blocked by the side closing part 52b. In this way, it is possible to reliably prevent dust from entering to the polygon mirror 35 side.

Furthermore, in the state in which the lid member 37 has been mounted at the casing 31, the plate-like part 37e protrudes from the lower surface of the lid member 37 to face the front side end surface of the image forming lens 36 with a space, and the side closing part 52b is fixed to the plate-like part 37e in the state in which the side closing part 52b has been elastically deformed such that it extends downward along a surface of the plate-like part 37e, which faces the image forming lens 36 side, and then reaches a side of the plate-like part 37e, which is opposite to the image forming lens, across the lower end of the plate-like part 37e.

According to this, the side closing part 52b can be firmly fixed to the plate-like part 37e, so that it is possible to prevent the side closing part 52b from being peeled off due to friction with the image forming lens 36 when the lid member 37 is mounted at the casing 31. Furthermore, the edge of the lower end of the side closing part 52b, which faces the image forming lens 36 side, can be formed in an arc surface shape, so that it is possible to reduce frictional force acting on the side closing part 52b when the lid member 37 is mounted at the casing 31. Thus, it is possible to more reliably prevent peeling-off the side closing part 52b when the lid member 37 is mounted at the casing 31.

Furthermore, the first elastic member 51 fixed to the bottom wall of the casing 31 is configured with a sponge softer than (having an elastic modulus smaller than that of) the second elastic member 52 fixed to the lid member 37. In this way, it is possible to prevent the image forming lens 36 from floating up by the repulsive force of the first elastic member 51.

Furthermore, the first elastic member 51 and the second elastic member 52 are configured with a sponge, so that it is possible to reduce deformation with the passage of time as compared with a case of using rubber for example.

<<Other Embodiments>>

In the aforementioned embodiment, the inspection hole 311 and the notched part 312 are formed at the left side from the image forming lens 36 in the casing 31; however, the present invention is not limited thereto and the inspection hole 311 and the notched part 312 may be formed at the right side (that is, the light emitting opening 39 side) from the image forming lens 36 in the casing 31. In this way, it is possible to further improve sealability of a space of the left side (that is, the polygon mirror 35 side) from the image forming lens 36. Accordingly, it is possible to reliably prevent duet and the like from being attached to the reflecting surface of the polygon mirror 35.

In the aforementioned embodiment, a printer has been described as an example of an image forming apparatus in which the optical scanning device 30 is installed; however, the image forming apparatus is not limited to the printer and for example, may include a facsimile, a copy machine, a multifunctional peripheral (MFP) and the like.

INDUSTRIAL APPLICABILITY

As described above, the present invention is available for an optical scanning device and an image forming apparatus including the same.

The invention claimed is:

1. An optical scanning device comprising a casing opened upward, a polygon mirror received in the casing to reflect light of a light source, a motor mounted at a bottom wall of the casing to rotationally drive the polygon mirror, an image forming lens supported from below by a plurality of bosses protruding from the bottom wall of the casing and provided on an optical path of the light reflected by the polygon mirror, a lid member closing an upper side of the casing, and a light emitting opening formed in the casing or the lid member and allowing the light having passed through the image forming lens to pass therethrough, wherein the optical scanning device further comprising:

a first elastic member fixed to the bottom wall of the casing and compressed by a lower surface of the image forming lens and the bottom wall to close a gap between the lower surface of the image forming lens and the bottom wall; and a second elastic member fixed to the lid member and compressed by an upper surface of the image forming lens and the lid member to close a gap between the upper surface of the image forming lens and the lid member, wherein the image forming lens is disposed such that airflow induced due to rotation of the polygon mirror ventilates one side to the other side in a main scanning direction in the vicinity of the image forming lens, and the second elastic member comprises:

an upper surface closing part extending in the main scanning direction between the upper surface of the image forming lens and the lid member; and a side closing part extending downward from an end of the one side in the main scanning direction on the upper surface closing part to cover an end surface of the one side in the main scanning direction of the image forming lens.

2. The optical scanning device of claim 1, wherein a low friction member is stacked on and fixed to an upper surface of the first elastic member, and a friction coefficient of the low friction member to the image forming lens is smaller than a friction coefficient of the first elastic member to the image forming lens.

3. The optical scanning device of claim 1, wherein, in a state in which the lid member has been mounted at the casing, a plate-like part protrudes from a lower surface of the lid member to face the end surface of the one side in the main scanning direction of the image forming lens with a space, and the side closing part is fixed to the plate-like part in a state in which the side closing part has been elastically deformed such that the side closing part extends downward along a surface of the plate-like part, which faces a side of the image forming lens, and reaches a side of the plate-like part, which is opposite to the image forming lens, across a lower end of the plate-like part.

4. The optical scanning device of claim 1, wherein the first elastic member and the second elastic member include a sponge.

5. The optical scanning device of claim 1, wherein the first elastic member fixed to the bottom wall of the casing is configured with a material softer than a material of the second elastic member fixed to the lid member.

6. An image forming apparatus comprising the optical scanning device of claim 1.

* * * * *